A. LOITRON.
VARIABLE SPEED GEARING.
APPLICATION FILED AUG. 7, 1907.

901,456.

Patented Oct. 20, 1908.

2 SHEETS—SHEET 1.

Witnesses

Inventor:
Achille LOITRON
by
Attorney

UNITED STATES PATENT OFFICE.

ACHILLE LOITRON, OF PLAINE ST. DENIS, FRANCE.

VARIABLE-SPEED GEARING.

No. 901,456.　　　　　Specification of Letters Patent.　　　　Patented Oct. 20, 1908.

Application filed August 7, 1907. Serial No. 387,493.

*To all whom it may concern:*

Be it known that I, ACHILLE LOITRON, a citizen of the French Republic, and resident of Plaine St. Denis, Seine, France, having invented certain new and useful Improvements in Variable-Speed Gearings, do hereby declare the following to be a specification.

This invention relates to improvements in variable-speed gearing for motor road vehicles and particularly to the peculiar construction of the clutches and of the means for connecting the clutches with the hand levers.

Figure 1:
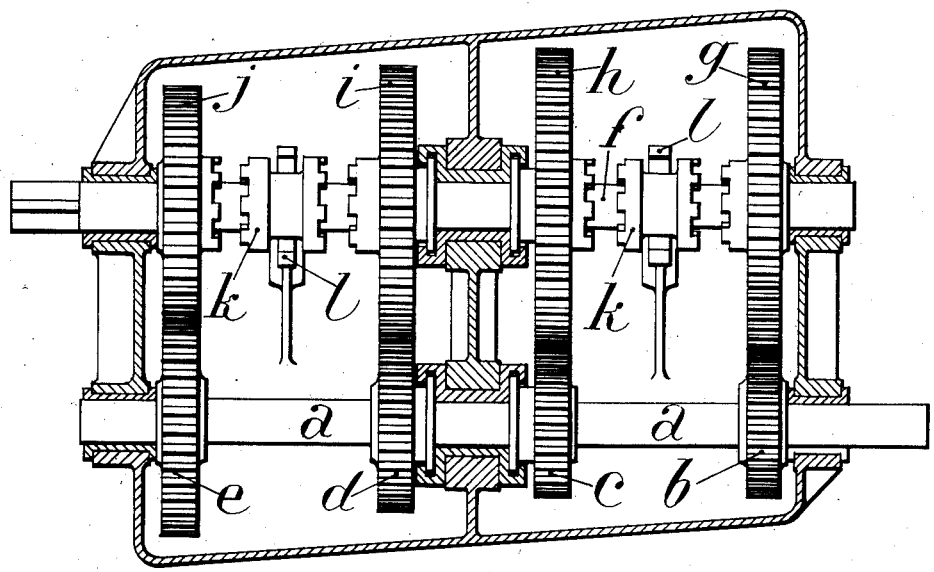
Figure 2:
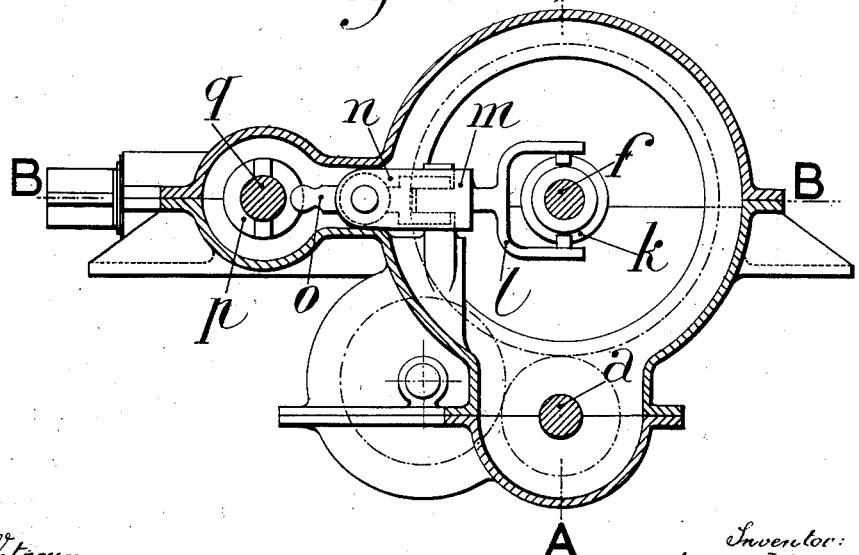
Figure 3:
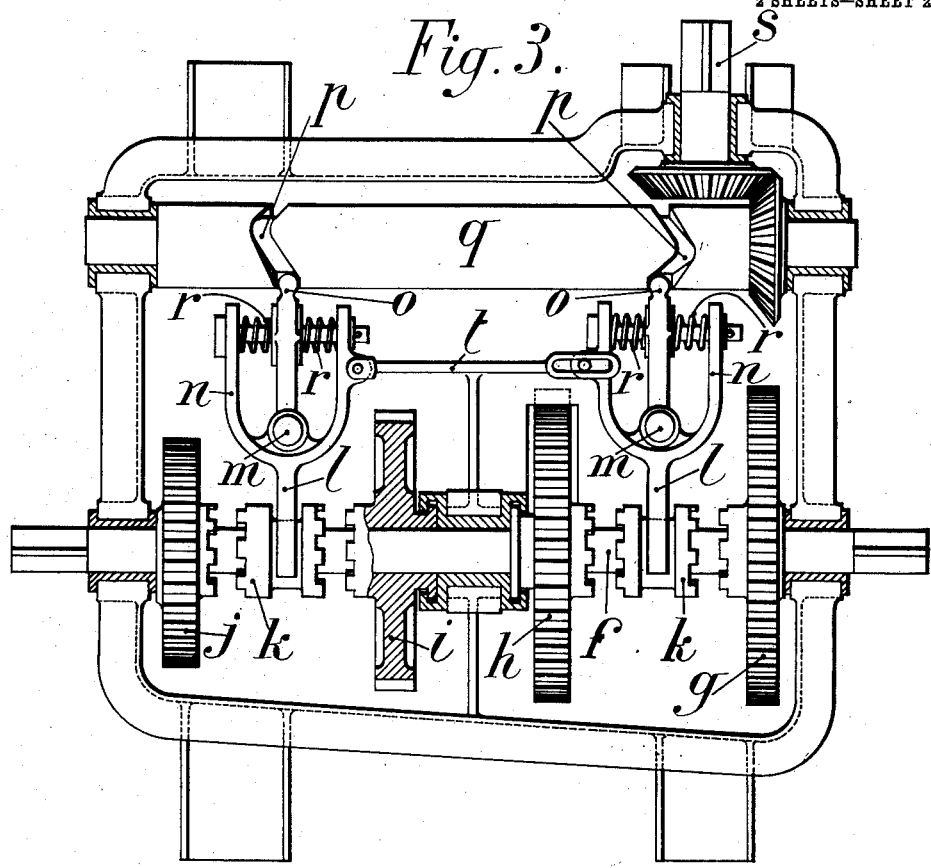
Figure 4:
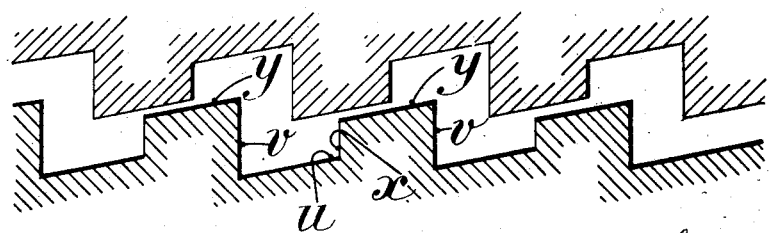

Of the accompanying drawings forming part of this specification Figure 1 is a longitudinal section on line A—A of Fig. 2. Fig. 2 is a cross section. Fig. 3 is a horizontal section on line B—B of Fig. 2. Fig. 4 shows on a larger scale a diagrammatical view of the teeth of the clutches.

The variable-speed gear forming the object of the present invention, belongs to the well known type of speed gearings, in which two series of gearing of progressive diameter are placed the one on the shaft driven from the engine through a coupling device and the other on the shaft which transmits the motion to the wheels.

The improved variable-speed gearing is constructed as follows:—The driving shaft $a$ has four pinion wheels $b$, $c$, $d$, $e$ and on the shaft $f$, which transmits the motion and which is parallel to the driving shaft, four loose pinion wheels $g$, $h$, $i$, $j$ are mounted. Between pinion wheels $g$ and $h$ on the one hand and $i$ and $j$ on the other hand, cogged sleeves $k$ are arranged which, adapted to be shifted along the driven axle $f$, clutch the axle when they revolve. The hubs of the loose pinion wheels $g$, $h$, $i$, $j$, are provided with teeth adapted to engage with the cogged sleeves $k$. These cogged sleeves $k$ are operated each through a separate fork $l$ which at $m$ is pivoted to the frame and has two arms $n$, $n$ between which the operating arm $o$ is located which is pivoted with one end at $m$ and the other end of which is guided in groove $p$ of a shaft $q$, which also may have suitable cams for acting upon said operating arm. Between the arms $n$, $n$ of the coupling fork and the corresponding end of arm $o$, springs $r$, $r$ are provided. The displacement of arm $o$ is thus elastically transmitted to the fork $l$ and consequently the variable-speed gearing can be actuated at any moment and without excessive resistance, even when the teeth of the sleeve $k$ bear upon the surface of the teeth of the coupling clutch instead of entering the spaces therebetween, in which case the springs will yield until the teeth are well engaged.

The shaft $q$ which operates the variable-speed gearing, is actuated through conical gears from axle $s$. A cam is keyed upon shaft $q$ or upon axle $s$ which effects the uncoupling of the device when the speed is changed. This device, which combined with the above described speed gearing forms one of the characteristic features of this invention, consists of a cam having three bosses, which is mounted in such a manner that each of the bosses acts upon the uncoupling device when the speed is changed.

To prevent the clutches for two adjacent speeds from entering into operation simultaneously, a connecting rod is provided which connects the two forks $l$ in such a manner that they are kept apart at a distance which prevents one sleeve to come into engagement with the corresponding clutch before the other sleeve is completely disengaged.

In the example shown in the drawings, conecting rod $t$ is linked to the two rear arms of forks $l$, $l$ which operate the sleeves $k$, $k$. This connecting rod $t$ has eyes for the reception of the pins of the forks to give sufficient liberty to each fork for the required displacement, the length of said slots being arranged in such a manner that none of the sleeves $k$ can be coupled before the other one has been disengaged. The detail construction of this connecting rod may be varied as well as its position and there could be used two connecting rods instead of one only.

The toothing of the coupling sleeves is suitably formed as shown in Fig. 4. Each tooth consists of an inclined part $y$ which forms the outer surface and is connected with the bottom surface $u$ of the adjacent notches through the surfaces $v$, $x$ which are radially arranged and run parallel to the axis of rotation, said bottom surface of the notches being inclined parallel with the outer surfaces $y$. It is obvious that the notches of each clutch correspond exactly to the teeth of the opposite one. This configuration of the teeth assures the immediate engagement of the clutches in the normal direction of the transmission of energy and for a sufficient depth to resist this effort; in fact, the action of the springs of the forks makes the two clutches abut one against the other and their inclined surfaces cause the same to mesh at once without any risk, that in consequence of the speed, the surfaces of the teeth slide the one on the other without meshing. The flattened part $x$ permits the motor to retard the car when the same exceeds its normal speed.

What I claim as my invention and desire to secure by Letters Patent is:—

Variable-speed gearing comprising a shaft two series of toothed wheels of progressive diameter, one series being loosely mounted upon the shaft, coupling clutches for coupling the loose toothed wheels with the shaft, forks for operating said clutches having two arms, and a guide arm for said fork located between said two arms, a pin connecting the ends of the three arms, spiral springs upon said pin between each lateral arm and the guide arm, a connecting rod, connecting the forks of two adjacent clutches being slotted to permit a certain play to the forks and an operating shaft for the forks having guide grooves for the guide arms of said forks substantially as described and shown and for the purpose set forth.

In witness whereof I have hereunto set my hand in presence of two witnesses.

ACHILLE LOITRON.

Witnesses:
 HENRI BLOUIN,
 HANSON C. COXE.